United States Patent [19]

Lautzenhiser

[11] Patent Number: 4,805,711

[45] Date of Patent: Feb. 21, 1989

[54] MECHANICAL CONTROL MECHANISM FOR CONVEYANCE

[76] Inventor: John L. Lautzenhiser, 726 Main Street East, Hamilton, Ontario, Canada, L8M 1K9

[21] Appl. No.: 25,330

[22] Filed: Mar. 13, 1987

[51] Int. Cl.⁴ .............................................. B60K 1/02
[52] U.S. Cl. ..................................... 180/65.1; 180/74;
180/907; 280/304.1; 188/2 F; 192/1.53
[58] Field of Search .............. 180/907, 74, 65.1, 221;
280/289 WC; 188/2 F; 192/2, 35

[56] References Cited

U.S. PATENT DOCUMENTS

| | | | |
|---|---|---|---|
| 2,544,831 | 3/1951 | Guyton | 180/907 |
| 3,225,854 | 12/1965 | Goerner | 180/221 |

FOREIGN PATENT DOCUMENTS 2455886  1/1981  France ........................... 180/907

Primary Examiner—David M. Mitchell
Assistant Examiner—Brian L. Johnson
Attorney, Agent, or Firm—Wendell E. Miller

[57] ABSTRACT

An electric wheelchair, or other conveyance, (10) is provided with a function control (80a) which includes a unitary control (82), and which is effective to control applying and releasing of power transmitted from an electric motor (28a) to a wheel, or to another type of propulsion element (12a), and to control applying and releasing of a parking brake (74a), in response to positioning of the unitary control (82).

40 Claims, 4 Drawing Sheets

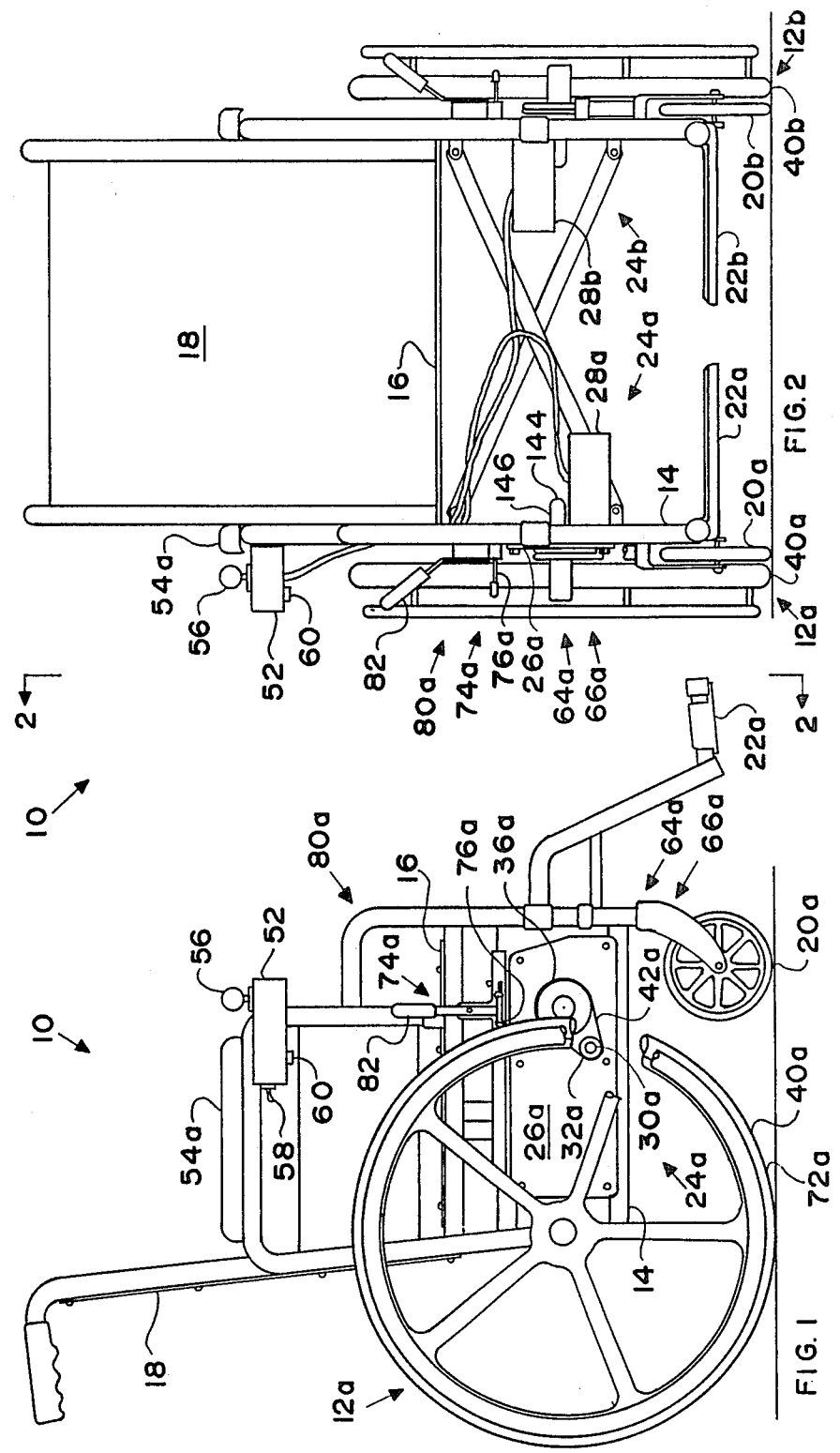

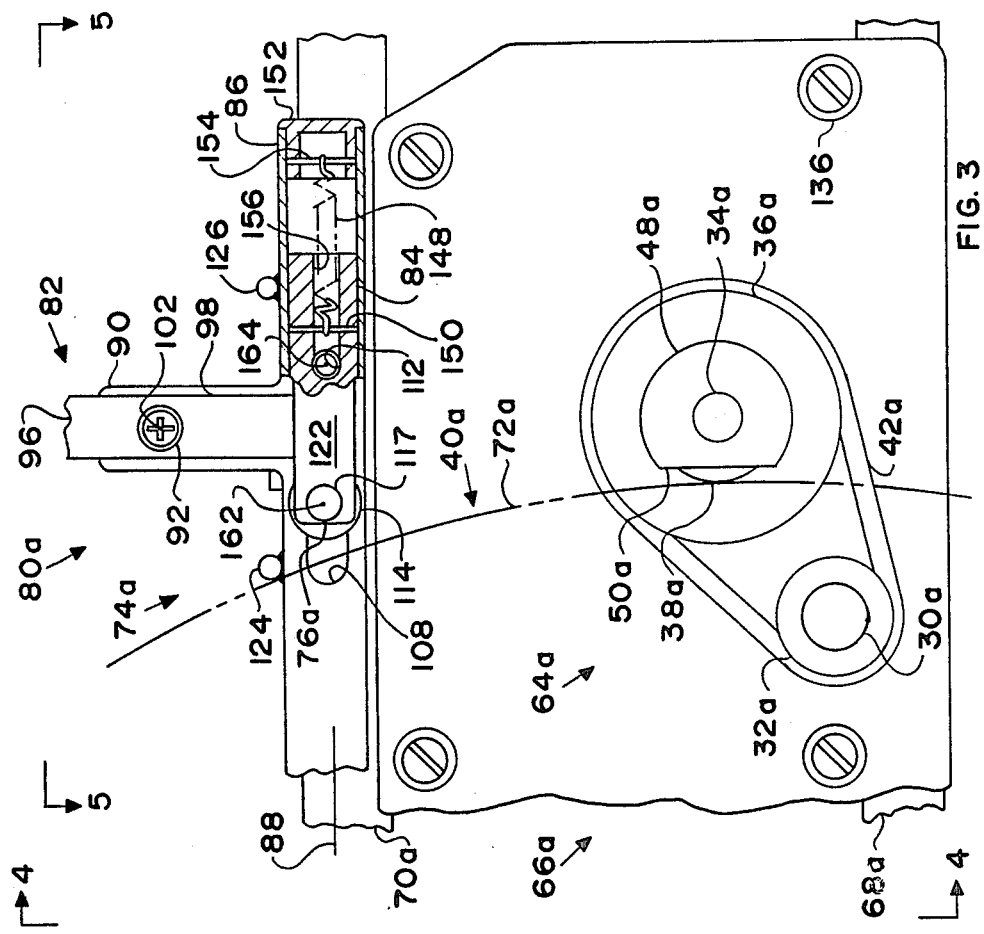

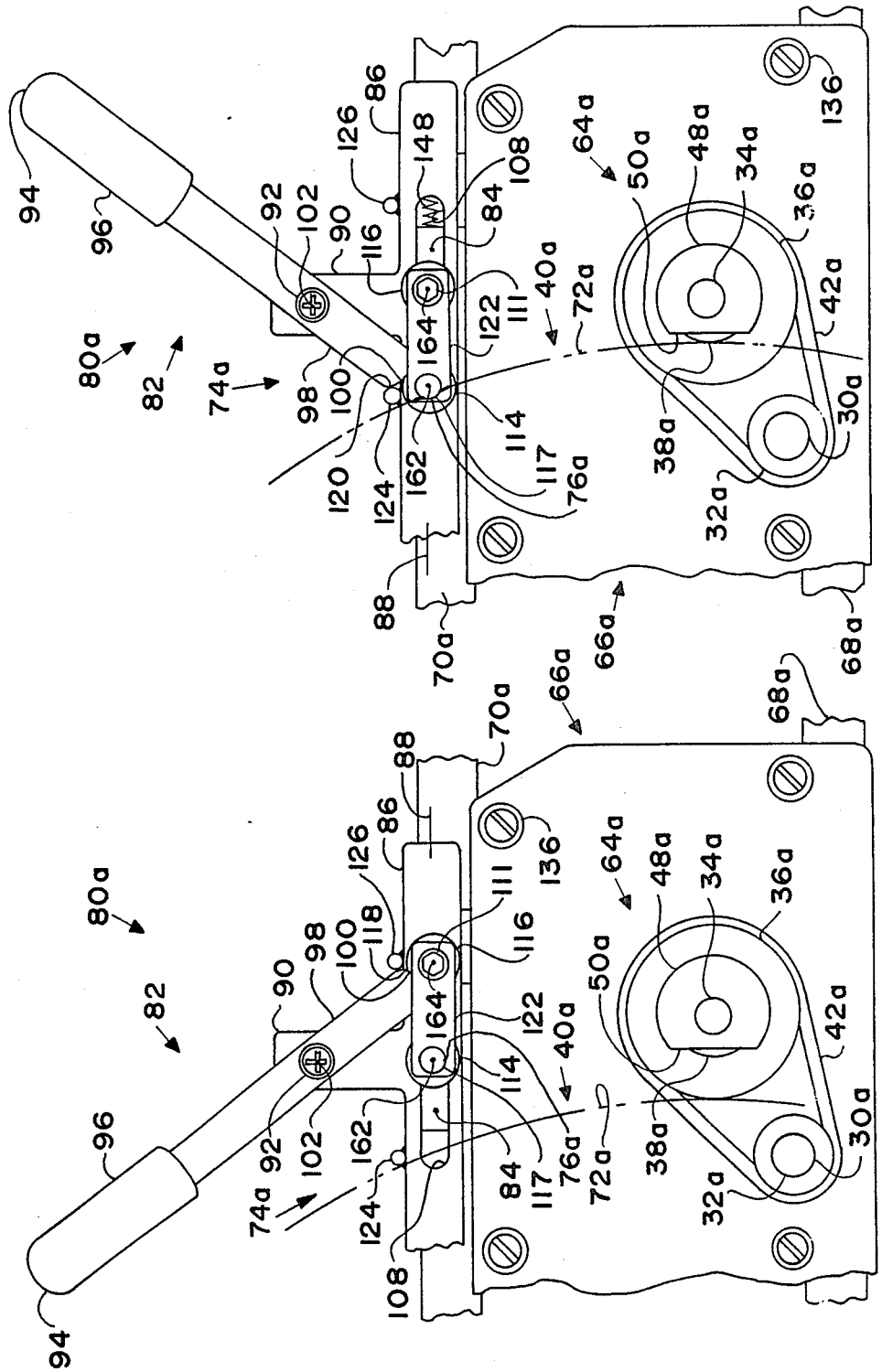

MECHANICAL CONTROL MECHANISM FOR CONVEYANCE

BACKGROUND OF THE INVENTION

1. Field of the Invention

The present invention relates to mechanical control mechanisms for conveyances. More particularly the present invention relates to a mechanical control mechanism for controlling application of the parking brake and for releasing the transmitting of power in conveyances such as electric wheelchairs.

2. Description of the Prior Art

Electric wheelchairs commonly have been adapted from manual wheelchairs by the addition of a battery, a pair of electric motors, a pair of mechanical drive mechanisms that connect the motors separately to left and right wheels, and an electrical control that controls the application of battery power separately and reversibly to the left and right wheels.

Further, prior art designs of electric wheelchairs commonly have included both mechanical mechanisms for separately releasing the mechanical transmitting of power from the electric motors to the wheels and separate parking brakes for each wheel.

Each mechanical drive mechanism commonly has included a reducing mechanism, such as a combination of a gear box and a pulley drive mechanism with the large pulley mounted on the wheel. The mechanisms for separately releasing the mechanical transmitting of power to the wheels commonly have been mechanisms for releasing belt tension. In some designs, a drive roller has been used to transmit power to the tire of the wheel; and releasing of power has been moving the drive roller away from the tire.

Separate parking brakes for left and right wheels commonly have been provided. Each parking brake has consisted of a toggle mechanism that includes both an actuating lever and a braking element. When the lever of one of the parking brakes is actuated to an over-center position, the braking element deformingly engages the resilient tire of that side of the wheelchair.

A degree of safety for occupants of electric wheelchairs, many of whom have lost some of their mental alertness, has been provided by dynamic braking; but this safety factor has not been a dependable one, as will be shown subsequently.

Dynamic braking commonly has been provided in electric wheelchairs as a natural result of poor mechanical efficiency of the mechanical drive mechanisms; but, more recently, in U.S. patent application Ser. No. 06/927,273, having a common inventor, electrical dynamic braking has been provided for wheelchairs that have mechanical drive mechanisms with good mechanical efficiencies.

Poor mechanical efficiency of mechanical drive mechanisms, which is even poorer when the wheels drive the electric motors, and the electrical dynamic braking of the aforesaid patent application, has protected occupants of electric wheelchairs from runaway conditions on slopes when changing from the parking mode to the electrically-propelled mode if the various mechanical controls have been positioned to leave the electric motors in driving engagement with the wheels when the mechanical brakes are released.

However, with prior art designs, it is possible to change from the parking mode to the electrically propelled mode by releasing the parking brake after the mechanical drives are engaged, or by releasing the parking brake before the mechanical drives are engaged. One order of actuation of the manual controls provides the safety of dynamic braking; and the other order invites harm to the occupant through a runaway wheelchair.

Further, in the stress of runaway conditions, and with the inertia thereof, a wheelchair may be overturned, and/or the occupant may be thrown from a wheelchair, by rapidly engaging the parking brake of one of the wheels. Therefore, it is important to reduce the danger of encountering runaway conditions.

SUMMARY OF THE INVENTION

The conveyance, or electric wheelchair, of the present invention includes a structural portion, left and right wheels, or propulsion elements, that are attached to the structural portion, a pair of electric motors, and a pair of power-transmitting mechanisms that transmit power separately from the electric motors to respective ones of the wheels or other propulsion elements.

A pair of power control mechanisms separately control applying and releasing of the power transmission by the power transmitting mechanism; and a pair of parking brakes separately brake rotation of the left and right wheels, or other propulsion elements.

A pair of function controls each include a unitary control, each control the power control mechanisms and the applying and releasing of power by one of the power control mechanisms, and each control applying and releasing of parking brakes to one of the wheels or other propulsion elements.

In a preferred embodiment, each power transmitting mechanism includes a pair of pulleys, belts of synthetic rubber, and a drive roller that drivingly engages the tire of a respective one of the wheels.

Each power control mechanism includes a mounting frame that is slidably mounted to the structural portion. One of the electric motors and one of the power transmitting mechanisms is attached to each of the power control mechanisms; and sliding movement of either of the mounting frames is effective to engage and to disengage the drive roller thereof from a respective one of the tires, and thereby to control transmitting of power by the power transmitting mechanism.

Preferably, each of the power control mechanisms is spring loaded to the position thereof wherein power is transmitted to the respective one of the wheels, or propulsion elements.

Each parking brake includes a braking element that engages the resilient surface of one of the tires when the parking brake is applied.

In a preferred embodiment, the function control includes a guide element of square tubes, a slide element that is slidably installed inside the guide element, the unitary control that is pivotally attached to the guide element, and a pair of actuating rollers that are attached to the slide element.

One of the actuating rollers is attached to the slide element by a pin that extends outwardly from the slide element and that functions as the braking element for engaging the tire when the parking brake is applied.

The same actuating roller, or the other actuating roller, is attached to the slide element by a pin that extends inwardly, that functions as a power control element, that engages the power control mechanism, and that moves the mounting frame and the drive roller to the positions thereof wherein the drive roller is disengaged from the tire when the unitary control is in a power-release position.

Each unitary control includes a centered position, or drive position, wherein the mounting frame and the drive roller are spring actuated to a position wherein the drive roller drivingly engages the tire of the wheel that is controlled by that unitary control.

Each unitary control includes a parking position wherein the braking element presses into the resilient surface of the tire of the respective one of the wheels.

In the parking position, the mounting frame of the power control mechanism remains in the drive position, and the drive roller remains in engagement with the tire of the respective one of the wheels. Therefore, actuating the unitary control between the drive and parking positions does not include a power release position wherein freewheeling, and runaway conditions, can occur.

Each unitary control includes a power-release position, that is adjacent to the drive position and that is remote from the parking position, wherein the drive roller is moved away from the respective one of the tires by the power-control element engaging the mounting frame.

The unitary control includes a handle portion, a lever portion, and a lever end. The lever portion selectively engages the actuating rollers to move the slide element, and both the braking element and the power-control element that are attached thereto, to the parking brake position and to the power-release position.

The unitary control cannot be moved away from the parking brake position by loads applied to the braking element, and cannot be moved away from the freewheeling position by loads applied to the power-control element, because the lever end of the unitary control engages the respective one of the actuating rollers when the unitary control is in either the parking brake position or the power-release position.

The dangers of runaway wheelchairs and personal injuries from runaway wheelchairs are reduced by providing a unitary control for applying and releasing of power and for applying and releasing of the parking brake. Further, dangers of runaway wheelchairs are reduced by locating the power-release position of the unitary control remote from the positions wherein the brake is applied and released, and wherein the drive roller engages the tire of the respective unitary control.

Dangers of personal injury are reduced by the unitary control in that movement of a single lever for each side of the wheelchair, in the only direction that it will move, is effective first to apply dynamic braking and to start to slow the wheelchair gradually, and if moved farther, is effective then to apply the parking brakes.

The present invention is applicable to various types of conveyances whether using wheels for propulsion elements, or whether using other types of propulsion elements, such as belts or tracks.

The present invention is applicable to conveyances having poor mechanical drive efficiency so that dynamic braking is an inherent function of the poor mechanical efficieny; and the present invention is applicable to conveyances having good mechanical drive efficiency, and having some other means of providing dynamic braking, such as the aforementioned patent application of common ownership.

It is a primary object of the present invention to provide a conveyance with improved safety for occupants thereof.

It is an object of the present invention to provide a conveyance in which runaway conditions cannot occur when changing from the parking mode to the drive mode thereof.

It is an object of the present invention to provide a conveyance which is simpler and easier to operate by providing a unitary control for controlling the application and releasing of power, and for controlling the applying and releasing of a parking brake.

It is an object of the present invention to provide controls for a conveyance which are reliable in operation and which are economical to manufacture.

It is an object of the present invention to provide a unitary control for conveyances in which the power control mechanism is in the drive position at the time the parking brake is released.

It is an object of the present invention to provide a unitary control for conveyances in which the power control mechanism includes a power-release position which is remote from the drive position, and which is remote from the brake-on position.

Other objects of the invention will become apparent from the description, drawings, and claims which are appended hereto.

BRIEF DESCRIPTION OF THE DRAWINGS

FIG. 1 is a side elevation of an electrically-powered wheelchair to which the present invention has been added;

FIG. 2 is a front elevation of the electric wheelchair of FIG. 1, taken substantially as shown by view line 2—2 of FIG. 1;

FIG. 3 is a side elevation of one of the function controls and related parts, showing the drive roller engaging one tire of the wheelchair, and showing the braking element spaced away from the tire;

FIG. 4 is an end view of the function control and related parts of FIG. 3, taken substantially as shown by view line 4—4 of FIG. 3, but with the power-transmitting parts deleted for simplicity and clarity;

FIG. 6 is a front view of the function control and related parts, taken substantially the same as FIG. 3, showing the drive roller moved away from driving engagement with the tire of the wheelchair, and showing the braking element spaced away from the tire; and FIG. 7 is a front view of the function control and related parts, taken substantially the same as FIG. 3, showing the drive roller in driving engagement with the tire, and showing the braking element engaging the tire.

DESCRIPTION OF THE PREFERRED EMBODIMENTS

Figure 5:
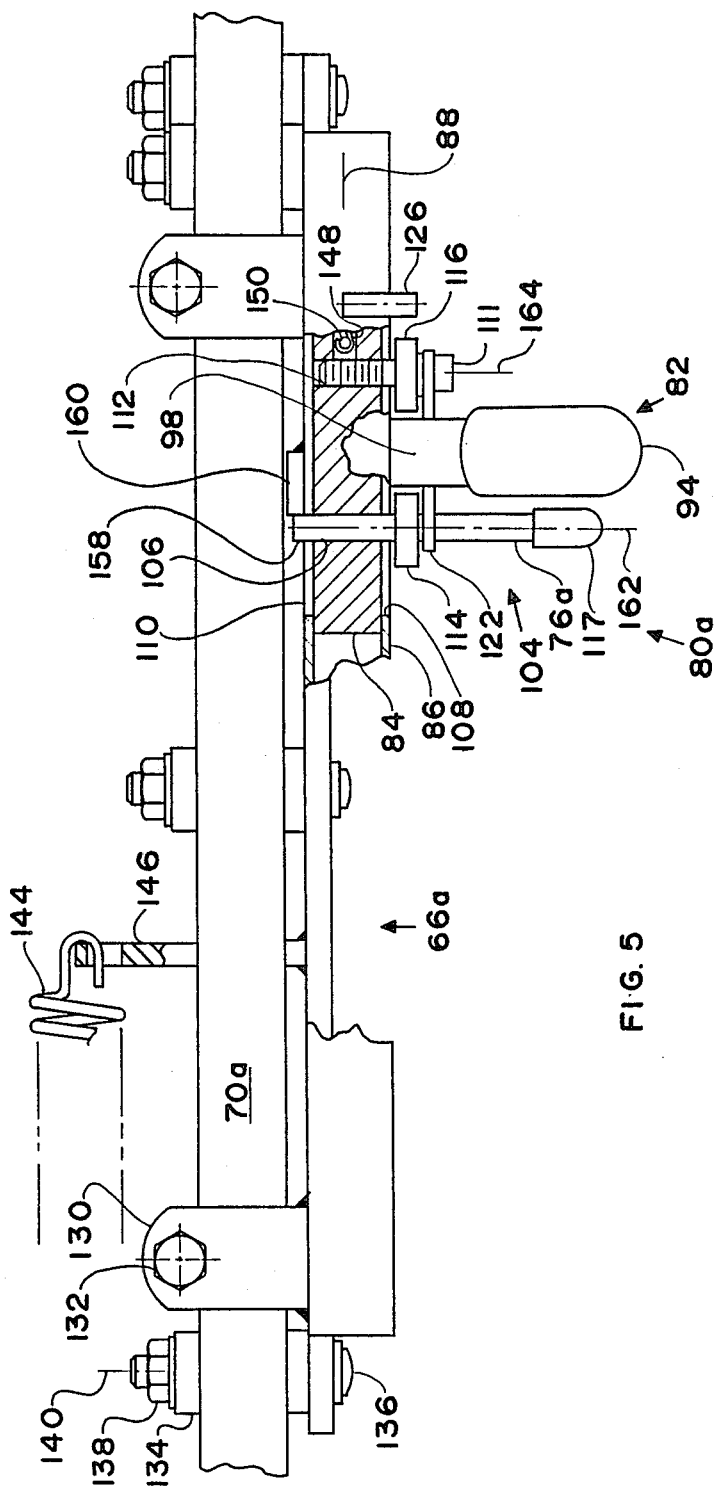
FIG. 5, is a top view of the function control and related parts of FIG. 3, taken substantially as shown by view line 5—5 of FIG. 3.

Referring now to the drawings, and more particularly to FIGS. 1 and 2, an electric wheelchair, or conveyance, 10 includes large wheels, or propulsion elements, 12a and 12b that are attached to a structural portion 14, a seat bottom 16 and a seat back 18 that are both attached to the structural portion 14, castor wheels 20a and 20b that are attached to the structural portion 14, and footrests 22a and 22b that are attached to the structural portion 14. The wheelchair discussed thus far is typical of the prior art.

The electric wheelchair 10 includes two drive units, 24a, and 24b which are, with minor variations, mirror images of each other.

Referring now to FIGS. 1-3, the drive unit 24a includes a mounting plate, or frame, 26a which is secured to the structural portion 14 of the wheelchair 10, a first electric motor, or right electric motor, 28a of the permanent field-magnet type which is mounted to the mounting plate 26a and which includes a motor shaft 30a that extends through the mounting plate 26a, a small pulley, or drive pulley, 32a which is mounted onto the motor shaft 30a, a stationary spindle 34a which is attached to the mounting plate 26a and which extends orthogonally outward therefrom, a large pulley, or driven pulley, 36a which is rotatably mounted onto the stationary spindle 34a, a drive roller 38a which is fixedly secured to the large pulley 36a and which drivingly engages a tire 40a of the wheel 12a, and two belts 42a which preferably are O-rings of a synthetic elastomer.

A roller guard 48a is disposed circumferentially around the drive roller 38a, is fixedly attached to the stationary spindle 34a, and includes a longitudinal slot 50a which allows the driver roller 38a to engage the tire 40a.

As seen in FIG. 2, a second motor, or left motor, 28b is at a different height than the right motor 28a; so that the motors, 28a and 28b, bypass each other when the wheelchair 10 is folded with the wheels 12a and 12b proximal to one another.

As seen in FIG. 1, the wheelchair 10 includes a control box 52 which is attached to the structural portion 14 close to an armrest 54a of the electric wheelchair 10, and which includes a control lever 56, an ON-Off switch 58, and a speed-power limiting control 60.

Referring now to FIGS. 1-4, the drive unit 24a includes the electric motor 28a, a power transmitting device 64a, and a power control device 66a.

The power transmitting device 64a includes the small pulley 32a, the large pulley 36a, the belts 42a, and the drive roller 38a. The power control device includes the frame 26a and mounting of the frame 26a for movement along rails, or square tubes, 68a and 70a. The electric motor 28a, the pulleys 32a and 36a, and the belts 42a have been deleted from FIG. 4 for simplicity and clarity.

The electric wheelchair 10 includes a parking brake 74a and the parking brake 74a includes both a braking element 76a and the tire 40a. As shown in FIG. 7, the braking element 76a engages the resilient surface 72a of the tire 40a to prevent the wheel 12a from rotating accidentally. The wheelchair 10 also includes a similar brake for the left wheel 12b.

Engagement of the drive roller 38a against the resilient surface 72a of the tire 40a is controlled by a function control 80a, as shown in FIGS. 3-7, and a similar function control controls power to the left wheel 12b.

The function control 80a also controls engagement of the braking element 76a with the resilient surface 72a of the tire 40a, as shown in FIGS. 3-7. A similar function control controls engagement of a similar braking element. Since the function control 80a, and a similar function control, are mirror images, description of the function control 80a will suffice for both. Further, since the controlling of power transmission from the motors 28a and 28b are the same for both of the wheels 12a and 12b, description of the transmitting and releasing of power to one of the wheels will suffice for both.

Referring now to FIGS. 3-7, the function control 80a includes a unitary control 82, an actuator element, or slide element, 84, and a guide element 86. The slide element 84 is inserted into the guide element 86 and is allowed to slide along a rectilinear slide axis 88. The guide element 86 includes a mounting post 90; and the unitary control 82 is pivotally mounted to the mounting post 90 by a machine screw 92. The unitary control 82 includes a handle end 94, a handle position 96, a lever portion 98, a lever end 100, and a pivot axis 102, which coincides with the location of the machine screw 92, divides the handle portion 96 from the lever portion 98.

The function control 80a further includes a dual purpose pin 104, as seen in FIGS. 4 and 5, that is disposed in a hole 106 of the slide element 84 and that extends through both ends of the slide element 84. The guide element 86 includes slots, or elongated openings, 108 and 110, which are disposed along the slide axis 88 and which allow the dual purpose pin 104 to extend out through the guide element 86, and which allow the pin 104 and the slide element 84 to move along a slide axis 88.

A cap screw 111 is spaced apart from the pin 104, extends in through the slot 108 of the guide element 86, and threads into a hole 112 of the slide element 84. Both the pin 104 and the cap screw 111 are disposed orthogonally to the slide axis 88.

An actuating roller 114 is rotatably disposed onto the pin 104 and an actuating roller 116 is rotatably disposed around the cap screw 111. The lever portion 98 of the unitary control 82 selectively engages the actuating rollers 114 and 116 to move the slide element 84 to the brake-on position, or another retained position, of FIG. 7 wherein the braking element 76a, which is a portion of the pin 104, engages the resilient surface 72a of the tire 40a, to the power release position or another retained position, of FIG. 6 wherein the drive roller 38a is moved away from driving engagment with the tire 40a, and to the drive position or intermediate retained position, of FIG. 3 wherein the drive roller 38a drivingly engages the tire 40a.

A plastic cap 117 is placed over the pin 104 to cover any sharp edge that may be on the pin 104 and is not a functional part of the invention.

The slide element 84 is maintained in the brake-on position of FIG. 7 by the lever end 100 engaging the actuating roller 114; and the slide element 84 is maintained in the power-release position by the lever end 100 engaging the actuating roller 116. The unitary control 82 includes a contour 118 which controls the force-distance relationship between movement of the handle portion 96 of the unitary control 82 and movement of the slide element 84 in one direction; and the unitary control 82 includes a similar contour 120 for controlling the force-distance relationship in the other direction.

The function control 80a further includes a retainer plate 122 which is mounted to both the pin 104 and the cap screw 111 and which maintains the actuating rollers 114 and 116 proximal to the guide element 86. The function control 80a further includes stop pins 124 and 126 which limit the rotational movement of the unitary control 82 about the pivot axis 102.

The function control 80a is attached to the square tubes 68a and 70a of the structural portion 14 of the wheelchair 10 by means of clamps 130 and bolts 132. The frame 26a is also mounted to the square tubes 68a and 70a. The mounting of the frame 26a to the square tubes 68a and 70a is by means of a plurality of guide blocks 134. Each of the guide blocks 134 is a cylindrical piece of plastic; and each of the guide blocks 134 is attached to the frame 26a by a bolt 136 and a nut 138 that is disposed along a cylindrical axis 140 of the guide blocks 134. As seen in FIG. 4, each of the guide blocks 134 includes a notch 142 which is disposed transverse to the cylindrical axis 140 and which guidingly engages one of the square tubes 68a or 70a. The guide blocks 134 mount the frame 26a to the structural portion 14 for movement of the frame 26a, the electric motor 28a, and the drive roller 38a to various longitudinal positions with respect to the tire 40a.

Referring now to FIGS. 3 and 5, when the unitary control 82 is in the position shown in FIGS. 3 and 5, a spring 144, which is attached to the structural portion 14 by any suitable means, and which is attached to the frame 26a by a tang 146, moves the drive roller 38a to a position wherein the drive roller 38a engages the tire 40a. At this time, the unitary control 82 is resiliently urged toward the centered position, as shown, by a spring 148. The spring 148 is disposed in a hole 156 in the slide element 84, is attached to the slide element 84 by a pin 150, and is attached to an end cap 152 by a pin 154. The spring 148, in addition to resiliently urging the slide element toward the cap 152, serves as a means for retaining the cap 152 inside the guide element 86.

When the unitary control 82 is moved to the position as shown in FIG. 6, a power control portion 158 of the dual purpose pin 104 engages a power release lug 160, which is shown in FIG. 5. The power release lug 160 is welded, or otherwise suitably attached, to the frame 26a. Thus as the unitary control 82 is moved toward the position thereof, as shown in FIG. 6, the dual purpose pin 104 engages the power release lug 160, moving the frame 26a, the electric motor 28a, and the drive roller 38a to the position, as shown in FIG. 6, wherein the drive roller 38a is spaced apart from the resilient surface 72a of the tire 40a.

When the unitary control 82 is moved to the position as shown in FIG. 7, the slide element 84 and the dual purpose pin 104 are moved to a position wherein the dual purpose pin 104 engages the resilient surface 72a of the tire 40a, thereby providing a parking brake function.

As seen in FIG. 5, and as previously described, it can be seen that the dual purpose pin 104 includes a power-control portion 158 that functions as a power-control element. Further, as previously mentioned, the pin 104 includes a portion 76a which functions as a braking element.

As seen in FIG. 5, the rollers 114 and 116 are spaced, respectively around roller axes 162 and 164 which are orthogonal to the slide axis 88.

In summary, when the unitary control 82 of the function control 80a is moved to the brake-on position, as shown in FIG. 7, the slide element 84 and the pin 104 are moved to a position wherein the braking element 76a engages the resilient surface 72a of the tire 40a. In this position of the unitary control 82, the drive roller 38a drivingly engages the resilient surface 72a of the tire 40a.

When the unitary control 82 is moved to the power-release position, as shown in FIG. 6, the drive roller 38a is moved away from the resilient surface 72a of the tire 40. At this time the parking brake 74a is in the brake-off position; because the braking element 76a is spaced apart from the resilient surface 72a of the tire 40a; and the wheelchair 10 may be moved by the person sitting in the wheelchair 10 by rotating the wheels 12a and 12b by hand, or by an attendant pushing the wheelchair 10.

When the unitary control 82 is moved to an intermediate position, or drive position, as shown in FIG. 3, the drive roller 38a is resiliently urged into a driving relationship with the resilient surface 72a of the tire 40a by the spring 144. Also, at this time, the parking brake is in the brake-off position; because the braking element 76a is spaced away from the resilient surface 72a of the tire 40a.

There is no position of the unitary control 82, between the brake-on and drive position, wherein the drive roller 38a is not drivingly engaged with the tire 40a. Therefore, in contrast to the prior art, there is little danger of the wheelchair 10 running out of control down an inclined surface.

In the prior art wherein separate controls were used to control engagement of the driving roller with the wheel and to control engagement of a braking element with the wheel, it was possible for the wheelchair to be without any braking control inadvertently. In contrast, the present invention provides dynamic braking through the drive roller 38a to the motor 28a.

In wheelchairs having poor mechanical efficiency from the drive rollers to the electric motors, dynamic braking is provided by the mechanical inefficiencies. For wheelchairs having good mechanical efficiency, electrical dynamic braking can be provided, as described in U.S. patent application Ser. No. 06/927,273 having a common inventor.

In order to understand the appended claims, it should be understood that the drive unit 24a includes a power transmitting device 64a and a power control device 66a. The power transmitting device 64a includes the pulley 32a, the belts 42a, the pulley 36a, and the drive roller 38a. The power control device 66a includes the frame 26a, slidably mounting of the frame 26a to the rails 68a and 70a by the guide blocks 134, and the spring 144.

Further, in the preferred embodiment, the guide element 86 serves as an attaching means for operatively attaching the actuator element, or slide element, 84 to the structural portion 14, and for allowing the actuator element 84 to be moved to the first, second, and intermediate positions thereof.

The present invention includes retaining means, which in the preferred configuration includes the end 100 of the unitary control 82, the spring 144, and the spring 148, for retaining the unitary control 82 in any selected one of the positions thereof, as shown in FIGS. 3, 6 and 7.

All three positions of the unitary control 82 are retained positions in that selectively positioning the unitary control 82 to any of the three positions produces corresponding positioning of the power control device 66a and the parking brake 74a.

While specific apparatus has been disclosed in the preceding description, and while numbers of specific parts or elements have been inserted into the claims, it should be understood that these specifics have been given for the purpose of disclosing the principles of the present invention and that many variations thereof will become apparent to those who are versed in the art. Therefore, the scope of the present invention is to be determined by the appended claims.

Industrial Applicability

The present invention is applicable to electric wheelchairs and to other conveyances, having either wheels or other types of propulsion elements, in which it is desirable to control applying of mechanically-transmitted power, releasing of power, applying of a brake, and releasing of a brake, with a unitary control.

I claim:

1. A conveyance (10) of the type having a structural portion (14), having a propulsion element (12a), having a motor (28a), and having a power transmitting device (64a) that transmits power from said motor to said propulsion element, the improvement which comprises:

power control means (66a), being operatively attached to said structural portion and being movable to drive and power-release positions, for cooperating with said power transmitting device to transmit power from said motor to said propulsion element when said power control means is in said drive position, and for releasing said transmitting of power when said power control means is in said power-release position;

braking means (74a), having brake-on and brake-off positions, for braking movement of said propulsion element when said braking means is in said brake-on position;

function control means (80a), comprising a unitary control (82) that is positionable to first and second retained positions, and to an intermediate retained position that is disposed between said first and second retained positions, for actuating said power control means to one of said positions thereof, and for actuating said braking means to one of said positions thereof; and said brake is in said brake-on position when said unitary control is in one of said positions thereof, said power control means is in said drive position when said unitary control is in two of said positions thereof, and said power control means is in said power-release position and said brake is in said brake-off position when said unitary control is in the third of said positions.

2. A conveyance (10) as claimed in claim 1 in which said releasing of transmitting of power comprises moving said motor (28a) with respect to said structural portion (14).

3. A conveyance (10) as claimed in claim 1 in which said releasing of transmitting of power comprises moving said power transmitting device (64a) with respect to said structural portion (14).

4. A conveyance (10) as claimed in claim 1 in which said power transmitting device (64a) comprises drive roller means (38a) for drivingly engaging said propulsion element (12a); and said power control means (66a), and said power-release position thereof, comprises disengaging said drive roller means from said propulsion element.

5. A conveyance (10) as claimed in claim 1 in which said power control means (66a) remains in said drive position as said braking means (74a) is actuated to said brake-on position.

6. A conveyance (10) as claimed in claim 1 in which said power control means (66a) is in said drive position when said unitary control is in said intermediate position; and said power control means remains in said drive position as said unitary control is actuated between said intermediate position and the one of said positions thereof that actuates said braking means to said brake-on position.

7. A conveyance (10) as claimed in claim 1 in which said function control means (80a) comprises an actuator element (84) that is operatively attached to said structural portion (14) and that is positioned to first and second positions in response to manual positioning of said unitary control (82) to respective ones of said positions thereof;

said actuating of said power control means (66a) to said positions thereof and said actuating of said braking means (74a) to said positions thereof comprises said actuator element; and said function control means (80a) comprises means (100) for preventing movement of said actuator element toward the other of said positions thereof when said actuator element is in either one of said positions thereof.

8. A conveyance (10) as claimed in claim 7 in which said releasing of transmitting of power comprises moving said motor (28a) with respect to said structural portion (14).

9. A conveyance (10) as claimed in claim 7 in which said releasing of transmitting of power comprises moving said power transmitting device (64a) with respect to said structural portion (14).

10. A conveyance (10) as claimed in claim 7 in which said power transmitting device (64a) comprises drive roller means (38a) for drivingly engaging said propulsion element (12a); and said power control means (66a), and said power-release position thereof, comprises disengaging said drive roller means from said propulsion element.

11. A conveyance (10) as claimed in claim 7 in which said power control means (66a) remains in said drive position as said braking means (74a) is actuated to said brake-on position.

12. A conveyance (10) as claimed in claim 7 in which said power control means (66a) is in said drive position when said unitary control is in said intermediate position; and said power control means remains in said drive position as said unitary control is actuated between said intermediate position and the one of said positions thereof that actuates said braking means to said brake-on position.

13. A conveyance (10) as claimed in claim 1 in which said function control means (80a) comprises a slide element (84) that is operatively attached to said structural portion (14) and that is rectilinearly positionable along a rectilinear slide axis (88) to first and second positions in response to manual positioning of said unitary control (82) to respective ones of said positions thereof;

said actuating of said power control means (66a) to said positions thereof and said actuating of said braking means (74a) to said positions thereof comprises said slide element; and said function control means (80a) comprises means (100) for resisting movement of said slide element toward the other of said positions thereof when said rectilinear slide element is in either one of said positions thereof.

14. A conveyance (10) as claimed in claim 13 in which said function control means (80a) comprises actuating roller means (114, 116) for receiving motion from said unitary control (82), and for transmitting said received motion to said slide element (84).

15. A conveyance (10) as claimed in claim 13 in which said unitary control (82) comprises a handle end (94), a handle portion (96) that extends from said handle end, a lever portion (98) that extends from said handle portion, and a lever end (100) that terminates said lever portion;

said function control means (80a) comprises pivotal attachment of said unitary control to said structural portion; and said means for resisting said actuator element from moving toward said other position thereof comprises said lever end operatively engaging said slide element.

16. A conveyance (10) as claimed in claim 13 in which said unitary control (82) comprises a handle end (94), a handle portion (96) that extends from said handle end, a lever portion (98) that extends from said handle portion, and a lever end (100) that terminates said lever portion;

said function control means (80a) comprises pivotal attachment of said unitary control to said structural portion (14); and said lever portion (98) of said unitary control (82) includes contoured means (118, 120), being disposed proximal to said lever end for effecting a change in the force-distance relationship of said unitary control to said slide element (84) as said unitary control approaches one of said positions thereof.

17. A conveyance (10) as claimed in claim 13 in which said function control means (80a) comprises actuating roller means (114, 116) for transmitting motion from said unitary control (82) to said slide element (84); and said actuating roller means comprises a first actuating roller (114) that is rotatably attached to said slide element at a first roller axis (162), and a second actuating roller (116) that is rotatably attached to said slide element at a second roller axis (164) that is spaced apart from said first roller axis.

18. A conveyance (10) as claimed in claim 13 in which said slidable attachment of said slide element (84) to said structural portion (14) comprises disposing said slide element inside a guide element (86) and operatively attaching said guide element to said structural portion.

19. A conveyance (10) as claimed in claim 18 in which said guide element (86) includes an elongated opening (108) that is disposed parallel to said slide axis (88); and said braking means (74a) includes a braking element (76a) that is operatively attached to said slide element, that extends generally orthogonally from said slide element, and that extends through said elongated opening.

20. A conveyance (10) as claimed in claim 18 in which said guide element (86) includes an elongated opening (108) that is disposed parallel to said slide axis (88); and said function control means (80a) includes a power control element (158) that is operatively attached to said slide element, that extends generally orthogonally from said slide element, and that extends through said elongated opening.

21. A conveyance (10) as claimed in claim 13 in which said power control means (66a) remains in said drive position as said braking means (74a) is moved to said brake-on position.

22. A conveyance (10) as claimed in claim 13 in which said power control means (66a) is in said drive position when said unitary control is in said intermediate position; and said power control means remains in said drive position as said unitary control is actuated between said intermediate position and the one of said positions thereof that actuates said braking means to said brake-on position.

23. A conveyance as claimed in claim 13 in which said power control means (66a), and said power-release position thereof, comprises power control element means (158), being operatively attached to said slide element (84) and extending orthogonally from said slide axis (88), for moving said motor (28a) with respect to said structural portion (14).

24. A conveyance (10) as claimed in claim 13 in which said power transmitting device (64a) comprises drive roller means (38a), for drivingly engaging said propulsion element (12a); and said power control means (66a), and said power-release position thereof, comprises power control element means (158), being operatively attached to said slide element (84), for moving said drive roller means with respect to said propulsion element (12a).

25. A conveyance (10) as claimed in claims 1, 7, or 13 in which said propulsion element (12a) includes a resilient surface (72a);

said braking means (74a) comprises a braking element (76a); and said brake-on position of said braking means comprises said braking element engaging said resilient surface.

26. A conveyance (10) as claimed in claims 1, 7, or 13 in which said propulsion element comprises a wheel (12a) having a tire (40a) of resilient material;

said braking means (74a) comprises a braking element (76a); and said brake-on position of said braking means comprises said braking element engaging said tire.

27. A conveyance (10) as claimed in claims 1 or 13 in which said propulsion element comprises a wheel (12a) having a tire (40a) of resilient material;

said power transmitting means (64a) comprises drive roller means (38a), being drivingly connected to said motor (28a) for drivingly engaging said tire 40a); and said power control means (66a), and said power-release position thereof, comprises moving said drive roller means with respect to said tire.

28. A function control (80a) for a conveyance (10) of the type having a structural portion (14), a propulsion element (12a), a motor (28a), a power transmitting device (64a) that transmits power from said motor to said propulsion element, a power control device (66a) that can be actuated to drive and power-release positions and that cooperates with said drive mechanism to transmit said power and to release transmitting of said power, and a brake (74a) that includes a brake-on position wherein movement of said propulsion element is braked and a brake-off position, the improvement which comprises:

actuating means, comprising an actuator element (84) that is positionable to first and second positions and to an intermediate position that is between said first and second positions, for actuating said brake to one of said positions thereof, for actuating said power control device to one of said positions thereof;

attaching means (86) for operatively attaching said actuator element to said structural portion, and for allowing said actuator element to be moved to said positions thereof;

unitary control means (82), being operatively connected to said attaching means, being movable to first and second positions, and being movable to an intermediate position that is between said first and second positions, for actuating said actuator element to said two of said positions thereof;

said brake is in said brake-on position when said unitary control means is in one of said positions, said power control device is in said drive position when said unitary control means is in two of said positions thereof, and said power control device is in said power-release position and said brake is in said brake-off position when said unitary control means is in the third of said positions; and retaining means (100, 148) for retaining said unitary control in any one of the three said positions thereof.

29. A function control (80a) as claimed in claim 28 in which said function control comprises means (100) for preventing movement of said actuator element (84) toward another one of said positions thereof when said unitary control means (82) is in said first or said second of said positions thereof.

30. A function control (80a) as claimed in claim 28 in which said function control comprises actuating roller means (114, 116) for receiving motion from said unitary control means (82), and for transmitting said received motion to said actuator element (84).

31. A function control (80a) as claimed in claim 28 in which said unitary control means (82) comprises a handle end (94), a handle portion (96) that extends from said handle end, a lever portion (98) that extends from said handle portion, and a lever end (100) that terminates said lever portion;

said function control means (80a) comprises pivotal attachment of said unitary control means to said structural portion (14); and said function control (80a) includes means, comprising said lever end operatively engaging said actuator element (84), for preventing movement of said actuator element toward said intermediate position thereof when said unitary control means is in said first or said second of said positions thereof.

32. A function control (80a) as claimed in claim 28 in which said unitary control means (82) comprises a handle end (94), a handle portion (96) that extends from said handle end, a lever portion (98) that extends from said handle portion, and a lever end (100) that terminates said lever portion;

said function control means (80a) comprises pivotal attachment of said unitary control means to said structural portion (14); and said lever portion (98) of said unitary control means includes contoured means (118, 120), being disposed proximal to said lever end, for effecting a change in the force-distance relationship of said unitary control means to said actuator element (84) as said unitary control approaches one of said positions therof.

33. A function control (80a) as claimed in claim 28 in which said function control comprises actuating roller means (114, 116) for transmitting motion from said unitary control means (82) to said actuator element (84); and said actuating roller means comprises a first actuating roller (114) that is rotatably attached to said actuator element at a first roller axis (162), and a second actuating roller (116) that is rotatably attached to said actuator element at a second roller axis (164) that is spaced apart from said first roller axis.

34. A function control (80a) as claimed in claim 28 in which said actuator element comprises a slide element (84);

said attaching means comprises a guide element (86) that is operatively attached to said structural portion (14); and said operative attachment of said actuator element to said structural portion comprises disposing said slide element inside said guide element and guiding said slide element along a rectilinear slide axis (88).

35. A function control (80a) as claimed in claim 34 in which said guide element (86) includes an elongated opening (108) that is disposed parallel to said slide axis (88); and said brake (74a) includes a braking element (76a) that is operatively attached to said slide element (84), that extends generally orthogonally from said slide element, and that extends through said elongated opening.

36. A function control (80a) as claimed in claim 34 in which said guide element (86) includes an elongated opening (108) that is disposed parallel to said slide axis (88); and said function control includes power control element means (158), being operatively attached to said slide element (84) and extending through said elongated opening, for actuating said power control device (66a) to one of said positions thereof.

37. A function control (80a) as claimed in claim 28 in which said power control device (66a) remains in said drive position when said brake (74a) is moved to said position wherein said brake is in said brake-on position.

38. A function control (80a) as claimed in claim 28 in which said actuator element comprises a slide element (84);

said attaching means comprises a guide element (86) that is operatively attached to said structural portion (14);

said operative attachment of said actuator element to said structural portion comprises disposing said slide element inside said guide element and guiding said slide element along a rectilinear slide axis (88); and said function control comprises means (100) for resisting movement of said slide element toward said intermediate position thereof when said unitary control means (82) is in either one of the other of said positions thereof.

39. A function control (80a) as claimed in claim 28 in which said power control device (66a) is in said drive position when said unitary control means is in said intermediate position; and said power control device remains in said drive position as said unitary control means is actuated between said intermediate position and the one of said positions thereof that actuates said brake to said brake-on position.

40. A mechanical control (80a) for actuating a power control mechanism (66a) to one position thereof, and for actuating a brake mechanism (74a) to one position thereof, which mechanical control comprises:
- slide element means (84), being moveable to first and second positions and to a position that is intermediate of said first and second positions, for actuating said power control mechanism and said brake mechanism to said positions thereof;
- guide means (86), for slidably receiving said slide element means therein, for guiding said slide element means in movement along a rectilinear slide axis (88), and for allowing said slide element means to be actuated to said positions;
- unitary control means (82), comprising a lever (98), being operatively attached to said guide means, being pivotally movable around a pivot axis (102) that is orthogonal to said slide axis, and being movable to first and second positions, for moving said slide element means to two of said positions thereof as said unitary control means is moved to respective ones of said positions thereof; and
- means (100), comprising said lever operatively engaging said slide element means, for preventing said slide element means from being moved toward said intermediate position thereof when said unitary control means is in said first or said second position thereof.

* * * * *

UNITED STATES PATENT AND TRADEMARK OFFICE
CERTIFICATE OF CORRECTION

PATENT NO. : 4,805,711

DATED : February 21, 1989

INVENTOR(S) : John L. Lautzenhiser

It is certified that error appears in the above-identified patent and that said Letters Patent is hereby corrected as shown below:

In column 6, "position" should be --portion-- in line 9, --and-- should be inserted between "92," and divides" in lines 11 and 12, "another" should be --one-- in line 33, a comma should be inserted between "position" and "or" in line 36, and a comma should be inserted between "position" and "or" in line 39. In column 8, --and-- should be inserted between "26a," and "slidably" in line 37.

Signed and Sealed this

Twenty-first Day of January, 1992

Attest:

HARRY F. MANBECK, JR.

*Attesting Officer*      *Commissioner of Patents and Trademarks*